United States Patent [19]

Shiseki

[11] 4,234,193
[45] Nov. 18, 1980

[54] SIMPLIFIED PHONOGRAPH CAPABLE OF SELECTING DESIRED GROOVES ON A RECORD DISC

[75] Inventor: Yutaka Shiseki, Kawasaki, Japan
[73] Assignee: Ozen Corporation, Japan
[21] Appl. No.: 43,319
[22] Filed: May 29, 1979

[30] Foreign Application Priority Data

Feb. 27, 1979 [JP] Japan .................................. 54-22339

[51] Int. Cl.³ .......................... G11B 3/08; G11B 17/06
[52] U.S. Cl. ................................ 274/1 A; 46/175 AR
[58] Field of Search ........... 274/1 A; 46/117, 175 AR

[56] References Cited

U.S. PATENT DOCUMENTS

| | | | |
|---|---|---|---|
| 3,620,538 | 11/1971 | Mercer et al. | 46/117 |
| 4,150,832 | 4/1979 | Watanabe | 274/1 A |

Primary Examiner—Steven L. Stephan
Attorney, Agent, or Firm—Basile, Weintraub & Hanlon

[57] ABSTRACT

A plurality of record grooves (2) are formed on a record disc (3) starting point (4). The grooves are positioned at radially different points of the record disc. When a pickup (6) is returned to each starting point (4) of the record groove (2) by means of a return spring (7) acting on a tone arm (8), the pickup (6) is positioned so as to be able to select one of the starting points of the record grooves. The selected groove corresponds to the planar position of this device, i.e., whether vertical or horizontal. The pickup 6 is positioned by means of a movable stopper 9 (a) correlated with a weight means (10).

An upright concentric cam (20) is provided near the center of the record disc (3) for releasing the record disc (3) from a stylus force applied thereto. This enables a sound transmitting member (22), which urges the pickup toward the record disc in playing, to be raised up and released from the stylus force when the pickup reaches the end or terminal point of sound reproduction. An inclined face of the cam, for lowering the swingable arm (13), subsequent to its initial raising up motion, is positioned at a point prior to the starting points of the record grooves, namely, in such a manner that the pickup is depressed onto the record disc prior to the arrival of the starting points at the position of the device where said pickup is lowered.

7 Claims, 8 Drawing Figures (A)

(B)

SIMPLIFIED PHONOGRAPH CAPABLE OF SELECTING DESIRED GROOVES ON A RECORD DISC

BACKGROUND OF THE INVENTION

I. Field of the Invention

This invention relates to a simplified phonograph capable of selecting at least two or more of record grooves on a record disc, depending upon the position, of the disc, i.e., whether horizontally or vertically oriented. The present invention is particularly adapted for incorporation into toys, such as dolls or the like, which are capable of reproducing different voices depending on the position thereof, i.e., whether the toy is held upright or laid down.

II. Description of the Prior Art

Hitherto, toys, such as baby dolls or the like, have been provided which begin to cry when they are laid down and stop crying when they are taken up and held upright when playing. This kind of selective sound reproduction applied to dolls is attractive to some extent. However, it would be more desirable if such a doll were constructed to provide different types of voice patterns. For example, a toy which begins to cry when it is laid down on a surface, such as a bed or a floor, and which laughs or speaks cheerfully when it is held or otherwise postured in an upright position offers apparent advantages over the prior art.

The mere starting or ceasing of one kind of voice depending on the position of a record disc has been accomplished heretofore by comparatively simple mechanisms, namely, by using a weight for actuating a switch or switches which breaks or establishes an electric circuit connected to a power source for a motor driving the record disc. However, the art has failed heretofore to incorporate such a toy bearing mechanism into a phonograph. This is because such toys require, by their nature, simplified construction. Additionally, the incorporation of such phonographic mechanisms into toys has been deemed likely to increase the cost of the final products.

The present invention, as will subsequently be detailed, incorporates a phonograph into a toy which generates different types of voice patterns depending on the orientation of the toy. The phonograph hereof is of simple construction which does not add any appreciable cost to the final product.

OBJECTS OF THE INVENTION

An object of the present invention is to provide a phonograph capable of raising different kinds of voices depending on the upright or laid-down positions in which the phonograph is held.

Another object of the present invention is to provide a phonograph of simplified construction capable of generating different kinds of voices which is of low cost.

A further object of the present invention is to furnish a phonograph as mentioned above which functions properly.

SUMMARY OF THE INVENTION

According to the present invention, the position on a record disc, to which a pickup of the phonograph is to be swingably returned, is selectively changed radially by virtue of a displacement of a weight means. The weight means is constructed such that it is displaced in a direction parallel to the plane in which the flat surface of the record disc extends. This enables the pickup to select any one starting point of any one of a plurality of record grooves formed on the record disc.

Because the weight means is displaced in a direction parallel to the plane along which the record disc extends, the weight means will move downwardly by gravity if the plane along which the record disc extends is the vertical plane.

A movable stopper is connected to the weight means. This provides adjustability to the return of the pickup or pickup arm for selection of radially different positions by means of the above-mentioned gravity displacement of the weight means.

According to the present invention, correlation between the movable stopper and the weight means can be accomplished in various ways such as:

(a) the stopper and the weight means are formed as separate pieces and are interconnected to define a link;

(b) a separate weight means is assembled to a movable stopper;

(c) the stopper and weight means are formed integrally into a single piece, or (d) the weight means is swivelly mounted to be capable of swinging and, also, concommitantly defines the movable stopper. Each mode of correlation is within the ambit hereof.

The present invention, also, comprises a timed cam which acts between the time when it lifts up a sound transmitter member of the phonograph and when it subsequently lowers the member such that the reproduction stylus of the pickup may firmly select an inner groove of the record disc when the device is held in upright position.

The profile of the face of the cam face has a first and second inclined face. Because of the timing required, the second inclined face, which acts to lower a swingable arm, maintains contact, for a period of time, with the swingable arm even when the tone arm has been laterally returned.

This manner of contact between the second inclined cam face and the swingable arm results in a certain restraint against a premature, as well as a delayed, return of the swingable arm. Otherwise a premature or delayed lowering of the pickup arm which is depressed by the sound transmitter member would result. By virtue of the cam construction, the sound reproduction stylus is placed in contact with the record disc under suitable pressure and at a position in front of the outwardly deflected starting points of the grooves of the record disc. This ensures that the stylus will correctly select and engage with the desired groove upon any further turning of the record disc. In other words, the second inclined face of the cam which acts to lower the swingable arm, is required to maintain those factors which enable the swingable arm to return in such a manner as to let the pickup arm to be lowered under depression at a portion suitably in front of the approaching starting points of the record disc.

The present phonograph enables the production of different kinds of voices depending on the orientation of the record disc.

The present invention further comprises a toy, such as a coll, having the present phonograph associated therewith. The toy hereof generates different types of voices depending upon the position of the toy, i.e., whether upright or horizontal.

For a more complete understanding of the present invention reference is made to the following detailed description and accompanying drawing. In the drawing, like reference characters refer to like parts throughout the several views in which:

DETAILED DESCRIPTION OF THE PREFERRED EMBODIMENTS

Figure 1:
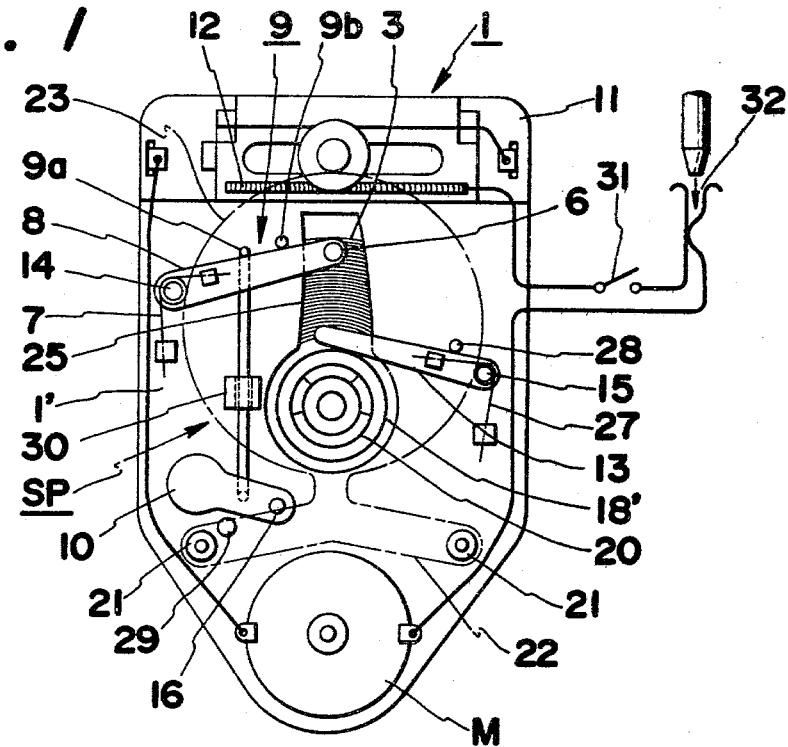
FIG. 1 is a top plan view of the phonograph in accordance herewith having the housing of a casing removed therefrom.

Now, and with reference to the drawing, and, in particular FIGS. 1–4, there is depicted a first embodiment of the present phonograph. As shown in the drawing a housing (not shown) of a casing 1 encases a chassis of the casing 1. A battery magazine 11 onto which a variable resistance 12 is mounted, constitutes a part of an electric circuit, disposed in the housing at a first side edge thereof.

At the side edge of the casing 1 opposite to the portion where the battery magazine is provided, an electric motor is disposed. The motor defines a driving source M.

A horizontal face plate 1' extends between the side edge where the battery magazine 11 is mounted and where the motor M is disposed and is secured to the casing. A tone arm 8, a swingable pickup or pickup arm 13 for actuating the tone arm 8 to return to its starting position and a weight means 10 are mounted onto the face plate 1'. The tone arm, swingable pickup and weight means are attached to the face plate 1' by means of pivot pins 14, 15 and 16 respectively.

The weight means 10 is pivotally attached to the face plate 1' such that it can be swung along the surface of the face plate.

A pickup 6 provided on the tone arm 8 and the tip end of the swingable arm 13 are situated below the lower face of a sound transmitter member 22 of a speaker unit SP.

As shown in the drawings, at least the upper portion of the pickup 6 slidably engages the lower face of the sound transmitter member 22. A reproducing stylus 26 disposed on the pickup 6 is urged by the force of a stylus force spring 24 so as to be pushed against the upper face of a record disc 3.

The pickup 6 slidably contacts with and supports a part of the speaker unit SP which is not otherwise supported by a pair of posts 21. Thus, a desired extent of stylus force is imparted to the pickup 6.

The tone arm 8 and the swingable arm 13 are urged, respectively, by a return spring 7 and a return spring 27, in directions toward the starting position of the record grooves, namely, the outer periphery of the record disc 3 and toward the speaker unit SP, respectively.

The tone arm 8 and the swingable arm 13, also, are restrained by a stopper means generally indicated at 9 and a stopper 28, respectively, from horizontal movement against the forces exerted, respectively, by the return springs 7 and 27. The stopper means 9 comprises a movable stopper 9a and a fixed stopper 9b.

The position of the stopper means 9 is dependent upon the starting points of the record grooves on the record disc, as will be explained hereinafter.

Figure 3:
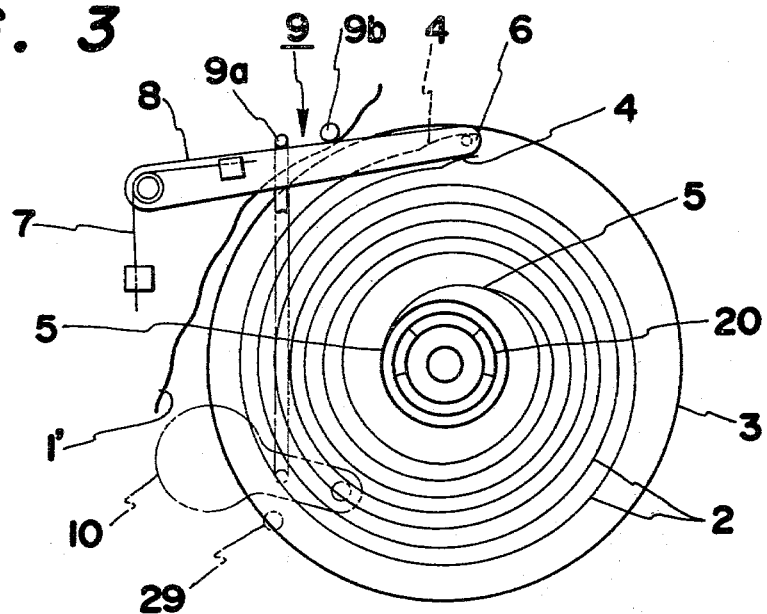
FIG. 3 is a partly fragmented plan view of the main components of the phonograph of the present invention showing a pickup located at a position to be engaged with the starting point of an outer sound groove of a recording disc.

Referring to FIG. 3, record grooves 2,2 are formed on the record disc 3 parallel to each other. Each groove has a terminal point 5,5 which is set adjacent to the center hole of the record disc 3. The starting or initial points for sound reproduction 4,4 are set near the outer periphery of the record disc and at different points, which are radially displaced from each other.

Although the embodiment shown in FIG. 3 illustrates two grooves capable of being selected for typical sounds or voices corresponding to the upright or horizontal position of the phonograph, it is also possible, as will be mentioned hereinafter, to increase the number of the movable stoppers, because the position of these stoppers can be linearly varied depending upon the intermediate inclination angle between the entirely upright position and the fully laid down position, to thereby enable further numbers of grooves. From a practical viewpoint, the maximum suitable number of record grooves is three.

As shown in FIG. 1 and FIG. 3, the fixed stopper 9b is formed integral with the face plate 1'. The stopper 9b is positioned at such a location that the reproducing stylus is positioned so as to be engaged with the starting point 4 of the outer record groove 2, when the tone arm 8 returns by means of the return spring 7 toward the periphery of the record disc.

The movable stopper 9a is fabricated of a metal wire bent into the shape of an inverted gate. One bent end of the wire forms an upright post. The post extends upwardly at the outer side edge of the tone arm 8 with respect to the direction of resilient force imparted by the return spring 7. The other end of the bent wire is connected to the middle part of the weight means 10 permitting relative rotation of the two members.

A straight rod or lever portion between the two bent ends is slidably held by means of a holder 30 intermediate the bent ends.

The weight means 10 is supported, at its side edge opposite the one facing the tone arm 8, by a supporter boss 29.

Figure 2:
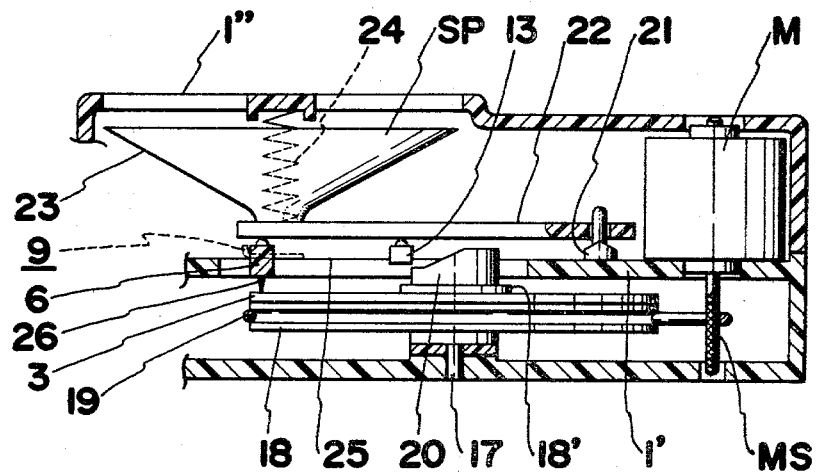
FIG. 2 is a sectional side elevational view showing the main components of the phonograph of the present invention.

In FIGS. 1 and 2, the pickup 6 is shown at a returned position where the device is placed in a horizontal plane. When in a horizontal plane, the pickup 6 is urged by the spring force of the return spring 7 to move up to the fixed stopper 9b and is ready to be engaged with the starting point 4 of the outer record groove 2.

Figure 4:
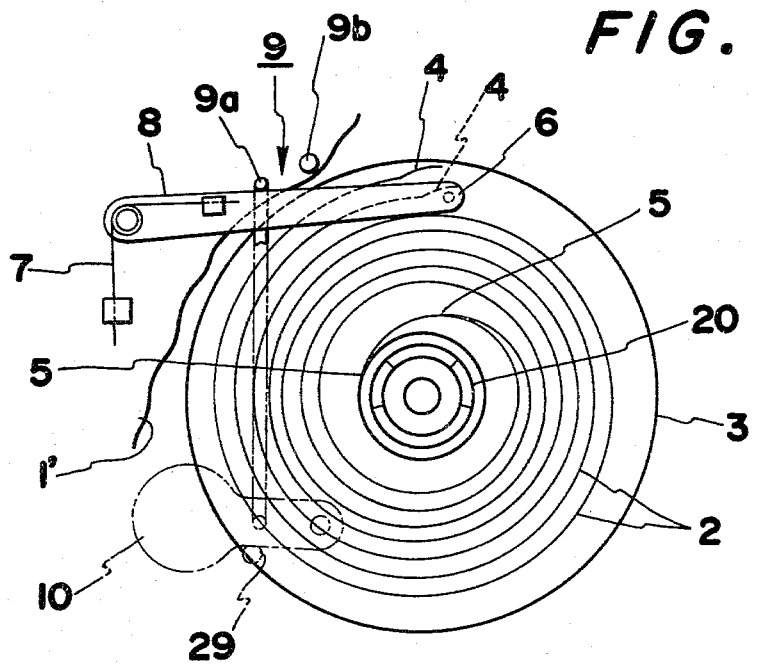
FIG. 4 is a view similar to FIG. 3, but showing the pickup at a position to be engaged with the starting point of an inner sound groove of a recording disc.

In FIG. 4 there is shown the relative location of the main components, when the device is set in an upright or vertical position. In this position, the weight means 10 descends, due to its own weight, up to the supporter boss 29. The movable stopper 9b, also, descends further, since it is pulled by the weight 10, with respect to the fixed stopper 9b. The pickup 6, at this position, is positioned to be faced with the starting point of sound reproduction 4 of the inner record groove 2.

The location of the supporter boss 29 is set such that the pickup 6, at it descended position, corresponds with the starting or initial point (diametrical direction) of sound reproduction 4 of the inner record groove 2.

Moreover, since the foremost portion of each recording groove 4, 4 is bent radially towards the outer periphery of the record disc 3, even if the location of the stopper means, namely, those of the fixed stopper 9b and the movable stopper 9a may slightly deviate, the pickup 6 is able to select the desired starting point of reproduction, without failure.

As explained above, the pickup 6, which is placed to be faced with either one of the two starting points of reproduction 4, 4 is biased or depressed downwardly by the sound transmitter member 22 due to the stylus force spring 24. The spring 24 biases the speaker unit SP such that the reproducing stylus 26 can be engaged with either one of the starting points 4, 4 of the desired groove of the record disc.

When the record disc 3 is rotated by the motor M as a driving source together with a turn table 18, the pickup 6 is guided to travel toward its terminal point of reproduction 5. During travel, the pickup 6 transmits the recorded vibration traced by the reproduction stylus 26 to the sound transmitter member 22.

The reproduced vibration transmitted to the sound transmitter 22 is further transmitted to the speaker 23, where it is further amplified into audible sounds.

Upon arrival of the pickup 6 to its terminal point of reproduction, it pushes the swingable arm 13 toward a cam 20 fixedly mounted on the turn table 18 and further urges the swingable arm 13 to ride the cam 20 against the spring force of the return spring 27.

Further rotation of the cam 20 caused by the rotation of the turn table 18, while engaging the swingable arm 13, enables the high lobe of the cam 20 to scoop up the swingable arm 13. This, in turn, lifts up the sound transmitter body 22 against the force of the stylus force spring 24. This action releases the pickup 6 from the stylus force and is, thus, reverted back to the starting point of sound reproduction 4 by the bias of return spring 7.

Still further rotation of the cam 20 makes the swingable arm 13 ride on to the next inclined lobe. This progressively lowers the arm 13 while it is prevented from prematurely returning due to the resistance given by the inclined face of the lobe which opposes rapid downward movement of the swingable arm.

Yet, further subsequent rotation of the cam 20 will lower the swingable arm to its lowest position and also release it from all restraints, thus, permitting the arm 13 to return to its normal position by means of the return spring 27, i.e., up to the stopper 28. Then the sound transmitter member is lowered such that the pickup 6 is imparted again with sufficient stylus force ready for starting sound reproduction.

In designing the cam profile, it is important that distribution and location of the second inclined lobe and the lower flat part shall be set such that the location where the swingable arm is released therefrom must be the same point to which the tone arm is depressed down onto the record disc adequately prior to the arrival of the approaching end points 4, 4 of the record grooves. This can be accomplished by selecting the position on the cam profile at which the swingable arm is released from the cam surface, according to the condition that the position is to be placed on a region of the cam defined by a circumferential angle corresponding to that of the region on the outer peripheral margin of the record disc within which region the pickup is desired to be depressed upon the record disc.

When the device is placed in its laid down or horizontal position, the effect of gravity is minimal, and the pickup 6 will revert by the force of the return spring of the tone arm up to the fixed stopper 9b. The reproducing stylus 26 is located at a position to be faced with and ready for engagement with the starting point of sound reproduction 4 of the outer record groove. On the contrary, when the device is held in upright position, or neutral position, the force of gravity on the weight means 10 is fully exerted on the movable stopper 9a to locate it to the position as shown in FIG. 4. In this position, the tone arm 8 is kept locked such that the pickup 6 is positioned at a place ready for engagement with the starting point of the inner record groove.

Accordingly, when the phonograph of the present invention is incorporated in a toy, such as a doll, if a crying voice is recorded in the outer recording groove and a laughing voice in the outer recording groove, respectively, a doll can be made very charming which laughs when it is taken in a children's arm and cries when it is placed laid down in bed.

Referring, again, to FIG. 1, a main switch 31 and an operation switch 32 comprise two contact points placed in the mouth of a doll which are capable of rendering an electrical circuit "OFF" when a finger of a hand of the doll, made as an insulator, is placed into the mouth and thus issues no sound, conversely, the contacts cooperate to render the circuit "ON" when the finger is taken away from the mouth.

Suitable timing for the reproducing stylus 26 to be descended on the record disc 3 is determined by positioning the second inclined lobe 20a of the cam 20 for subsequently lowering the swingable arm 13 such that it is placed prior to, i.e., is delayed about 70° to 100° of the rotational angle with respect to the starting point 4 of the inner recording groove 2.

Figure 7:
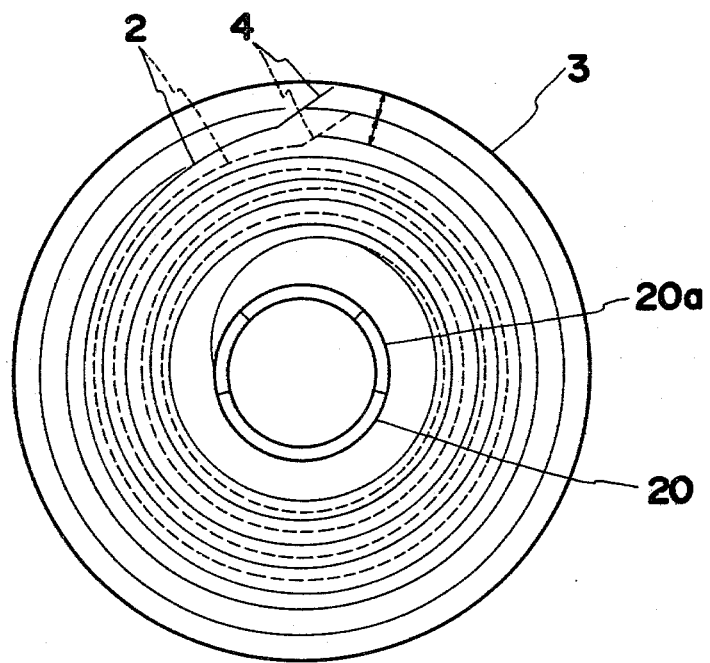
Figure 7:
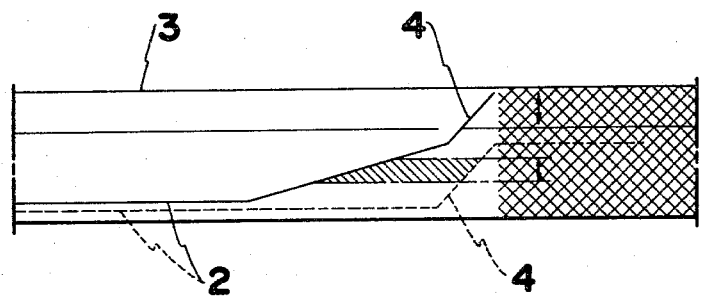

In FIG. 7, there is illustrated a plan view, developed in a straight plane, which shows the relation between the two starting points 4, 4 of the recording grooves 2, 2 and an area of poor selection likely to be caused in selecting the starting point of the desired record groove. If the recording stylus falls on the shaded area, the stylus cannot select the inner record groove. In order that either one of the outer or the inner record grooves may be selected, as desired, depending upon the horizontal or vertical position of the phonograph, the stylus must be lowered so as to be contacted with the record disc within the area shown by the cross-shaded or mesh-like pattern as shown in front of the two starting point 4, 4, to wit, at the right side portion of FIG. 7 (B).

In order that the above requirement can be satisfied, relative location of the two starting points and that of the second inclined lobe face 20a of the cam 20 are fixed to satisfy the condition described hereinabove.

Figure 5:
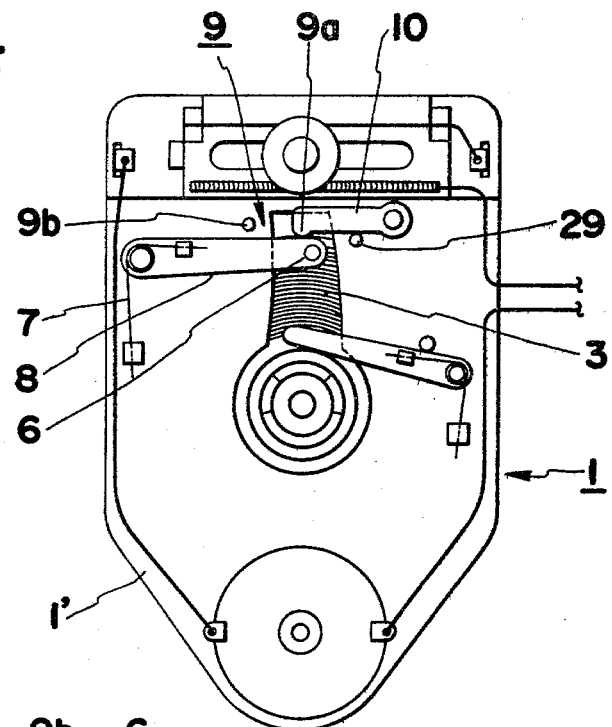
FIG. 5 is a top plan view of an alternate embodiment of the present phonograph with its housing removed.

In FIG. 5 there is shown another embodiment of the present invention, wherein the movable stopper is integrally formed with the weight means. In other words, the movable stopper 9a portion of the stopper means 9 also defines the weight means 10.

In accordance herewith the weight means 10 is swingably attached to the face plate 1' at a portion outside the direction in which the tone arm 8 is urged by the return spring 7. Accordingly, if the phonograph is held upright or vertically, it is swung down up to a supporter 29 so as to sustain the pickup 6 against the spring of the return spring 7.

In this location, sound reproduction stylus of the pickup 6 is positioned to be faced with the starting point of the inner record groove as shown in FIG. 4 of the preceding embodiment.

When the device of this invention is placed in the horizontal or laid down position, the amount of gravity exerted by the movable stopper 9a, which, also, acts as the weight means 10, is negligible. Consequently the movable stopper 9a is urged back by means of the spring force of the return spring 7 of the tone arm 8. Hence, the pickup 6 is positioned at a location restrained by the fixed stopper 9b.

Under this condition, the sound reproduction stylus 26 of the pickup 6 is disposed at a position facing the starting point of reproduction of the outer record groove 2 (FIG. 3).

Figure 6:
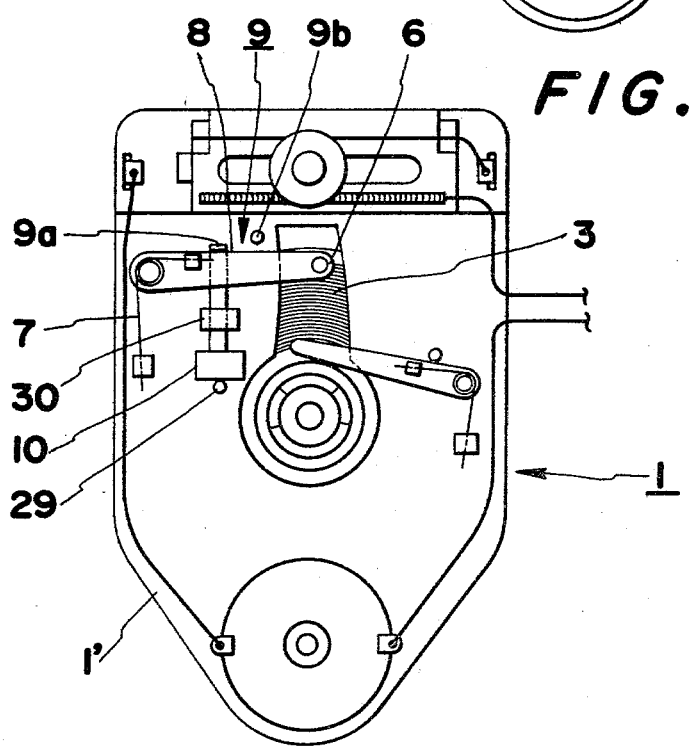
FIG. 6 is a top plan view of a further embodiment of the present phonograph with its housing removed, and FIGS. 7A and B are a schematic plan view showing the relation between the starting points of sound reproduction and the area onto which a reproducing stylus is lowered.

In FIG. 6 there is shown a still another embodiment of the present invention wherein the movable stopper 9a of the stopper means 9 is slidably received on the face plate 1'. The weight means 10 can be either an integral part of or separate from the movable stopper 9a.

When the device of this construction is held upright, the movable stopper 9a is positioned at a location where it is sustained by the supporter 29 such that the sound reproduction stylus is faced with the inner record groove as shown by FIG. 4 of the first example, while if the device is held upright the stylus is positioned to select the outer record groove as shown in FIG. 3.

It is to be appreciated from the preceding that there has been described a device which enables the playing of a variety of voices depending on the orientation of the device. It is to be further appreciated that the construction of the present device is simplified from other devices in that the pickup of the device can be returned to a desired position by the lateral movement of the associated weight means. This simplified construction enables production of durable toys having low production costs.

I claim:

1. A simplified phonograph capable of selecting a record groove on a record disc for sound reproduction which comprises:
   (a) a housing;
   (b) a record disc having a plurality of record grooves, each groove having a starting point and a terminal point for sound reproduction, the starting point of each groove being radially offset from every other groove and the terminal point of each groove is radially substantially distinct from any starting point;
   (c) a driving source for rotating the disc and disposed on that housing;
   (d) a tone arm which includes a pick up, the tone arm being swingably mounted on the housing, the tone arm traveling along one of the grooves from the starting point to the terminal point;
   (e) means for normally biasing the tone arm toward a starting point of a groove;
   (f) a stopper mounted on the housing, the stopper stopping the pickup against a resilient force imparted by the means for biasing, the stopper being positioned at points corresponding to the starting point of each groove, the stopper being constructed such that the pickup can be positioned at a position corresponding to each starting point of each groove, the stopper comprising a movable stopper member retained in the housing, the stopper member being movable in a direction parallel to a plane in which the record disc extends;
   (g) a speaker unit housed within the housing, the speaker unit comprising a speaker and a sound transmitter;
   (h) means for urging the sound transmitter toward the record disc;
   (i) means for actuating the pickup to return the pickup to a starting point, the means for actuating releasing the pickup from a stylus force normally imparted thereto to enable the return of the pickup;
   (j) a weight retained in the housing and associated with the movable stopper member, the weight being movably mounted in the housing and being movable with the movable stopper member in the same direction therewith, the weight moving the movable stopper member against the resilient force of the means for biasing to position the movable stopper member in a first position when the phonograph is in a vertical position and the resilient force of the means for biasing moving the weight and the movable stopper member to a second position when the phonograph is in a horizontal position, and
   wherein the phonograph selects one record groove to be reproduced when in the horizontal position and a different record groove when in the vertical position.

2. The phonograph of claim 1 wherein the weight is integrally formed with the movable stopper.

3. A simplified phonograph as claimed in claim 1, wherein the weight is swivelly mounted in the housing for swing movement correlated to the movement of the movable stopper.

4. A simplified phonograph as claimed in claim 3, wherein:
   the movable stopper member comprises a pair of standing posts and a lever portion between said posts, the movable stopper extending in a direction parallel to the plane in which the record disc extends, one of the posts of the movable stopper being connected to the middle of the weight means to permit relative movement therebetween such that the movable stopper member and the weight are interconnected to perform a link motion.

5. A simplified phonograph as claimed in claim 1, wherein said weight is swivelly mounted to the casing to enable it to be swung in a direction parallel to a plane in which said record disc extends, the weight defining the movable stopper by retaining the pickup when the housing is in the vertical position.

6. A simplified phonograph as claimed in claim 1, wherein:
   (a) the movable stopper member comprises a pair of upright posts and a lever portion extending therebetween, the movable stopper extending in a direction parallel to the plane in which said record disc extends, and
   (b) the weight is integrally attached to said lever portion.

7. A simplified phonograph as claimed in claim 1 wherein:
   (a) the means for actuating said pickup to return toward the starting point of sound reproduction comprises an upright cam having at least one inclined lobe, the cam being disposed concentrically with and near the center of said record disc, and (b) the inclined lobe of said cam enables lowering of the swingable arm, the lobe being positioned to satisfy a condition that the swingable arm is lowered and released from contact with the cam so that the pickup can be depressed down onto the record disc prior to the arrival of the approaching starting points of the record grooves during the rotation thereof.

* * * * *